A. M. McPHILLIPS

Feb. 17, 1931. Re. 17,971

BAR FOR BEATER ENGINE ROLLS

Original Filed Nov. 1, 1927

Inventor

A. M. McPhillips

By Seymour & Bright

Attorneys

Reissued Feb. 17, 1931

Re. 17,971

UNITED STATES PATENT OFFICE

ARTHUR M. McPHILLIPS, OF BELOIT, WISCONSIN

BAR FOR BEATER-ENGINE ROLLS

Original No. 1,674,911, dated June 26, 1928, Serial No. 230,281, filed November 1, 1927. Application for reissue filed October 30, 1930. Serial No. 492,270.

This invention relates to beating engines for macerating paper stock and has special reference to the beater bar or knife, the object being to provide a beater bar by the use of which a more complete circulation and disintegration of the stock than has heretofore been possible will be attained. The invention is illustrated in the accompanying drawing and will be hereinafter fully described, the novel features being particularly pointed out in the appended claims.

In the drawing, Fig. 1 is a plan view of a beater roll having the present invention embodied therein;

Figure 1:
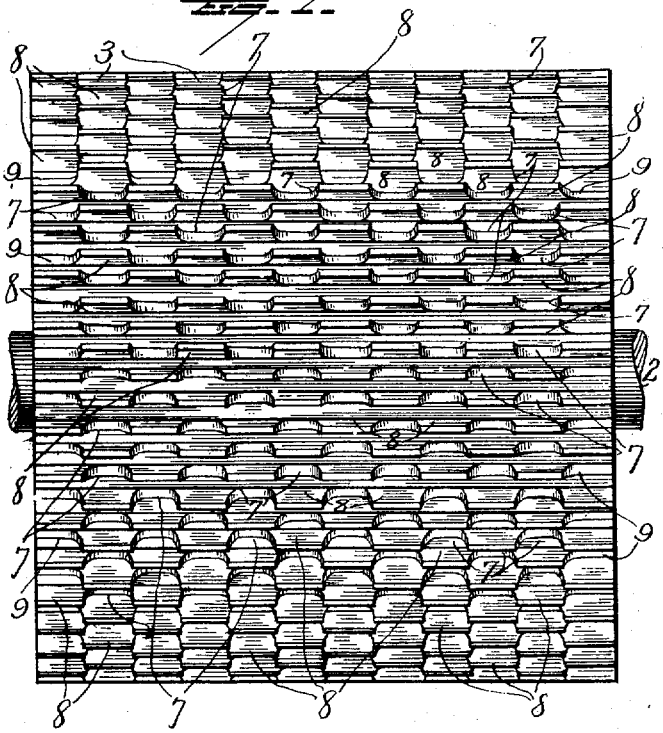
Figure 2:
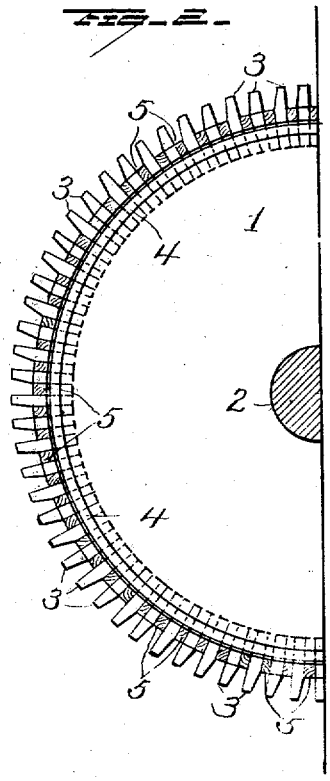
Fig. 2 is an end view of a portion of the roll.
Figure 3:
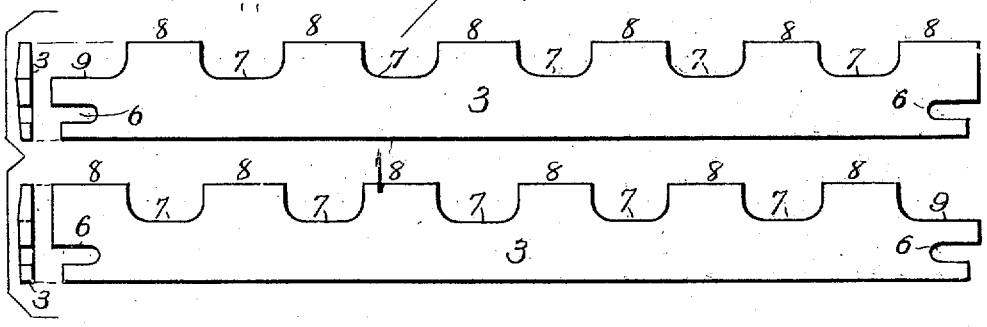
Fig. 3 is a view showing two of the bars in elevation.

The beater roll is mounted in the tank or tub in the usual or any approved manner and consists of disks, one of which is indicated at 1, secured upon a central shaft 2, beater bars or knives 3 extending parallel with the shaft and held to the disks by end rings 4, and wedge blocks 5 driven between adjacent knives or bars to maintain them in fixed spaced relation. Generally the bars or knives 3 have their inner edges seated in recesses provided therefor in the edges of the several disks, and the end rings engage in notches 6 in the ends of the knives so that when the several parts are assembled the knives will be very firmly secured. In the outer or working edge of each knife or bar, spaced notches or crenels 7 are formed and the bars are arranged so that the notches in adjacent bars are staggered, each notch in each bar being alined circumferentially of the roll with a lug or merlon 8 between two notches in the adjacent bars. It will be noted, more particularly upon reference to Fig. 3, that the opposite outer corners of alternate bars are cut away, as at 9, on lines corresponding to the contours of the notches 7, so that the staggered notch structure is carried to the extreme ends of the beater roll. In other words, each bar has an equal number of crenels and merlons, so the working edge of the bar begins with a merlon and ends with a crenel. In placing the bars in the roll alternate bars are reversed, thereby bringing the merlons of each bar opposite crenels in the bars on each side of it. Preferably the merlons and crenels are of equal length and are sufficiently limited in number to give the merlons a substantial width.

The beater roll is rotated in the tank in the usual manner to cause the bars to successively impinge upon and work through the stock. The notches help the working edges of the bars to act upon the stock so as to quickly disintegrate the same, the stock being torn or shredded and the tendency of the same to wrap around the roll being overcome. The bar embodying this invention creates a greatly increased suction through the stock so that the latter circulates more rapidly and efficiently than with the devices now in use and the work is completed in less time and with less power than has heretofore been necessary.

While, for illustrative purposes, the invention has been shown embodied in singly spaced bars, the bars may be arranged in clusters, and it will be understood that the dimensions of the notches may be varied according to the characteristics of the stock to be treated. In practice, a plurality of interchangeable sets of bars will be provided so that, before starting work, the operator may apply to the roll the bars best adapted to the particular stock which is to be treated.

Having fully described my invention what I claim as new and desire to secure by Letters-Patent, is:—

1. A beater roll having circumferentially spaced beater knives provided with spaced crenels in their working edges, the intervening portions of the working edge forming merlons of substantial width, the crenels in adjacent knives being relatively staggered.

2. A beater roll having circumferentially spaced beater knives, having spaced crenels in their working edges, the intervening portions of the working edges forming merlons of substantial width, the working edge of each bar beginning with a merlon and ending with a crenel, alternate bars being reversed so as to bring the merlons of each bar opposite crenels in the bars on each side of it.

3. As an article of manufacture, a beater bar having spaced crenels in its working edge, the intervening portions of the working edges forming merlons of substantial width, there being an equal number of crenels and merlons, thereby causing the working edge to begin with a merlon and end with a crenel.

4. As an article of manufacture, a beater bar having spaced crenels in its working edge, the intervening portions of the working edge forming merlons of substantial width, there being an equal number of crenels and merlons, thereby causing the working edge to begin with a merlon and end with a crenel; one side of said bar being substantially flat, the opposite side consisting of two planes, one inclining from each edge, said planes meeting at a point intermediate said edges, the first merlon being at the left hand end of the bar, when the flat side of the bar faces the observer and the crenelated edge is uppermost, the last crenel terminating at the right hand end of the bar.

5. As an article of manufacture, a beater bar having spaced crenels in its working edge, the intervening portions of the working edge forming merlons of substantial width, there being an equal number of crenels and merlons, thereby causing the working edge to begin with a merlon and end with a crenel; one side of said bar being substantially flat, the opposite side consisting of two planes, one inclining from each edge, said planes meeting at a point intermediate said edges, the first merlon being at the right hand end of the bar, when the flat side of the bar faces the observer and the crenelated edge is uppermost, the last crenel terminating at the left hand end of the bar.

6. In combination, a pair of beater bars, each bar having spaced crenels in its working edge, the intervening portions of the working edges forming merlons of substantial width, there being an equal number of crenels and merlons, thereby causing the working edge to begin with a merlon and end with a crenel; one side of each bar being adapted to function as the forward side of the bar when the beater roll of which it is a part revolves, the first merlon being at the left hand end of one bar when the crenelated edge is uppermost and said forward side faces the observer, the last crenel terminating at the other end of the bar, the other bar being the reverse of the first, so when the bars are in juxtaposition in a roll their crenels will be in staggered relationship.

7. As an article of manufacture, a beater bar having spaced crenels in its working edge, the intervening portions of the working edge forming merlons of substantial width, there being an equal number of crenels and merlons, thereby causing the working edge to begin with a merlon and end with a crenel; one side of said bar being substantially flat, the opposite side consisting of two planes, one inclining from each edge, said planes meeting at a point intermediate said edges, the first merlon being at one end of the bar, the last crenel terminating at the other end of the bar, the bottoms of said crenels being substantially co-incident with the apex of the angle formed by said planes.

8. As an article of manufacture, a beater, bar having spaced crenels in its working edge, the intervening portions of the working edge forming merlons of substantial width, the width of the crenels and merlons being equal and there being an equal number of crenels and merlons.

ARTHUR M. McPHILLIPS.